May 25, 1926. 1,586,405
C. L. BURGE
AUTOMATIC LIQUID SUPPLY MEANS FOR WATER TANKS OF AIR WASHERS
Filed June 2, 1924
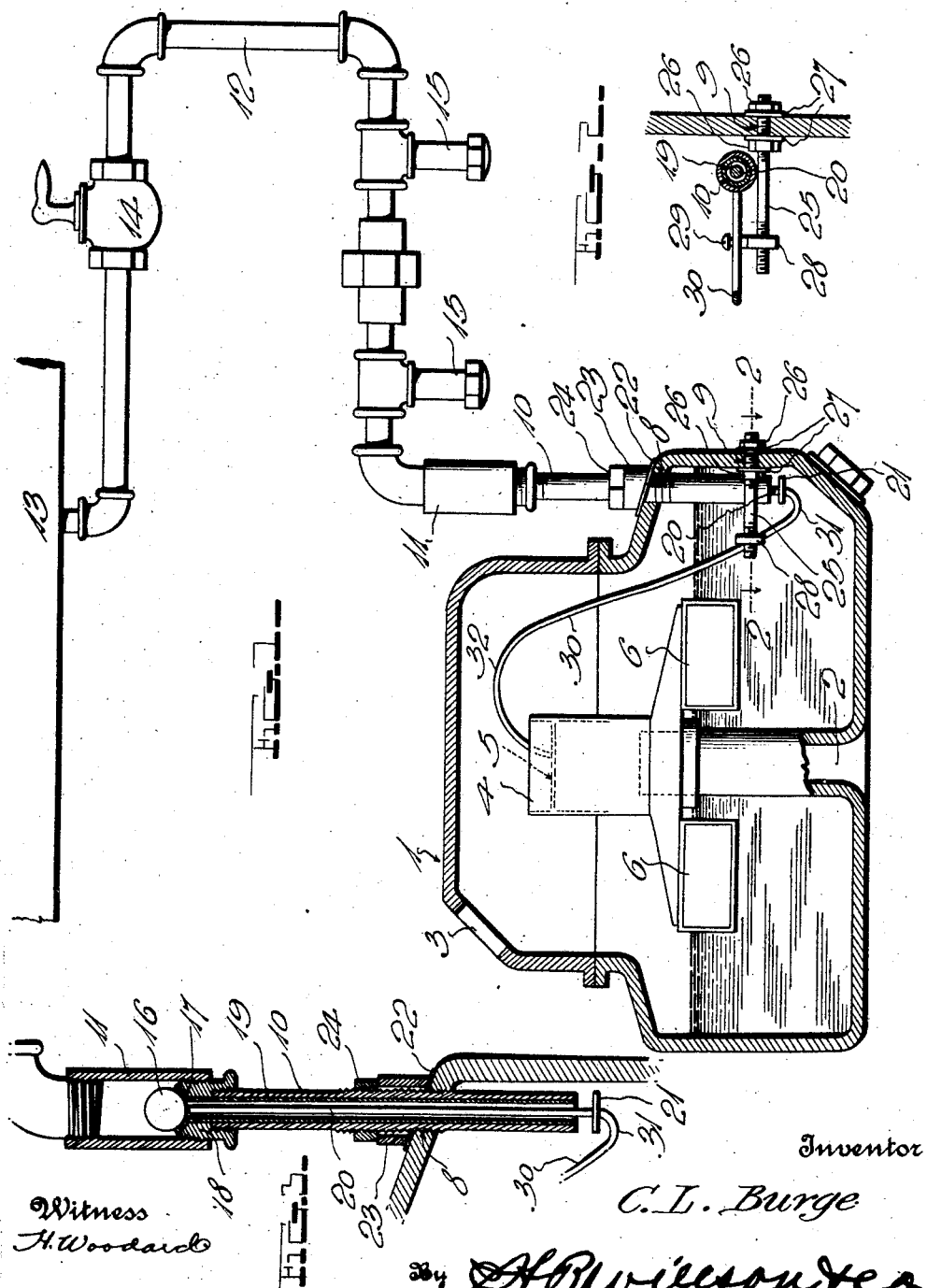
Inventor
C. L. Burge
Witness
H. Woodard Patented May 25, 1926.

1,586,405

UNITED STATES PATENT OFFICE.

CHARLES L. BURGE, OF LINCOLN, INDIANA.

AUTOMATIC LIQUID-SUPPLY MEANS FOR WATER TANKS OF AIR WASHERS.

Application filed June 2, 1924. Serial No. 717,355.

Tractors designed for farm and highway use, are commonly provided with air washers for cleansing the air taken into the carbureter, so as to remove any dust and other foreign matter therefrom. In a well known form of air washer, a vertical air inlet or stand pipe rises into a water tank, a tubular air guide, closed at its upper end and open at its lower end, slides freely over said pipe, and a float carries said guide to always maintain it in a predetermined relation with the surface of the water regardless of the amount in the tank. Tanks of this character must be filled by hand, which is more or less troublesome and is frequently necessary, particularly in hot dry weather, when the tractor is being operated upon dusty fields. It is the object of my invention, however to provide a novel water supply means for the tank including a valve which is controlled by the movement of the above mentioned float, lowering of said float serving to open the valve and supply more water to the tank, whereas return of said float to a raised position, effects closing of the valve and cuts off the supply of water until more is needed. Thus, the tank of the air washer may be supplied from a reservoir carried by the tractor and having sufficient volume to feed the washer for quite a long period of time, for instance, for an entire day or perhaps several days.

With the foregoing in view, the invention resides in the novel subject matter hereinafter described and claimed, the description being supplemented by the accompanying drawing.

Figure 1 is a vertical sectional view partly in elevation showing an air washer improved in accordance with my invention.

Figure 2 is a horizontal sectional view on line 2—2 of Fig. 1.

Figure 3 is an enlarged vertical sectional view showing more particularly the valve mechanism of the water supply line.

In the drawings above briefly described, the numeral 1 designates the water tank of an air washer, which tank is provided at its bottom with a stand pipe 2 forming an air inlet, the top of said tank being formed with an outlet 3 which communicates with the air inlet of the carbureter (not shown). Sliding freely over the stand pipe 2, is an air guiding sleeve 4 which is open at its lower end but is provided at its upper end with a closure plate 5 which is spaced a slight distance below the upper extremity of the sleeve. This air guiding sleeve is carried by a float which is formed of two sections 6. A filling plug (not shown) is commonly provided to fill the tank with water and the latter supports the float 6 so as to maintain the lower end of the guide 4 at a predetermined relation with the surface of the water, so that the incoming air must contact with said water and deposit any dust or other foreign matter with which it may be laden.

In carrying out the preferred form of my invention, I form a vertical opening 8 through an inwardly offset portion of the tank wall and a horizontal opening 9 through said wall at a point below the opening 8. Threaded through the opening 8 is a vertically disposed pipe section 10 which leads to a valve housing 11, which housing is connected by a suitable piping 12 with a water reservoir 13. The piping 12 is preferably provided with a manually controlled valve 14 and with a pair of septics or sumps 15. Within the housing 11, I have shown a ball check valve 16 which seats normally against a suitable seat 17 of copper or other non-corrosive material, carried by the lower end 18 of said housing, which end may well be in the form of a threaded plug carried by the upper end of the pipe 10. This pipe is also preferably provided with a non-corrosive lining 19, and within this lining, a vertical rod 20 is freely and loosely slidable, said rod having an enlarged head or disk 21 at its lower end, spaced downwardly from the pipe.

In the preferred form of construction, I place a gasket 22 upon the substantially horizontal portion of the tank 1, through which the opening 8 is formed, a sleeve 23 surrounds the pipe 10 and contacts with said gasket, and a nut 24 is threaded on said pipe in abutting relation with the upper end of the sleeve. This construction constitutes a leak-proof joint as well as effectively bracing the pipe with respect to the tank.

In the opening 9, above referred to, I thread the outer end of the horizontal arm 25, which arm is preferably in the form of a short length of rod. Upon this rod, I prefer to thread nuts 26 at the inner and outer sides of the tank wall and appropriate gaskets or washers 27 may be interposed between the wall and the nuts, as shown. Upon the inner end of the rod or arm 25, I have illustrated a collar 28 which may well be threaded thereon, and fulcrumed at 29 to this collar, an inclined lever 30 has been shown, which lever may well be formed of a length of stiff wire. The lower end of this lever is bent upwardly as indicated at 31 and engages the lower side of the head or enlargement 21, while the upper end of said lever is bent downwardly into arch form as indicated at 32 and contacts with the upper end 5 of the air guiding sleeve 4. It will thus be seen that the vertical movement of the float and the sleeve will control the lever 30 and that the latter will in turn control the rod 20 and the valve 16.

Assuming that there is no water in the tank 1, when the tank 13 is filled, the sleeve 4 will then stand at a lowered position and the comparatively long, upper arm of the lever will descend and cause the lower arm thereof to raise, thus forcing upwardly upon the rod 20 and holding the valve 16 in an open position. Thus, water from the tank 13 will run through the piping into the tank 1 and as the level rises in this tank, the float and the sleeve 4 also rise, and by the time the water level has reached a predetermined extent, the lever 30 has been moved out of engagement with the rod 20 so that the check valve 16 closes and cuts off the water supply. As the water level recedes in the tank 1, due to evaporation by the air passing through the washer, the sleeve 4 lowers and operates the lever 30 to open the valve 16, so that the supply of water in the tank will be automatically replenished.

It will be seen from the foregoing that simple, inexpensive and efficient means have been provided for carrying out the object of the invention and while the details disclosed are preferably followed, it is to be understood that within the scope of the invention as claimed, numerous modifications may be made.

I claim:

1. A device of the class described comprising a liquid tank, said tank having an upper portion of its wall inwardly offset from the lower portion of said wall, said lower portion being formed with a horizontal opening and the part of the wall which connects said offset upper and lower portions being provided with a vertical opening, a vertical liquid supply pipe passing through said vertical opening and secured therein, a short horizontal rod passing through said horizontal opening adjacent the lower end of said pipe, nuts threaded on said rod and engaging the inner and outer sides of the wall to tightly secure said rod in place, a valve in said pipe adapted to close the passageway through the pipe and having an operating stem provided with a horizontal disk spaced downwardly from the lower end of the pipe, an inclined lever fulcrumed near its lower end to the inner end of said rod, said lower end of the lever being turned upwardly and contacting with the lower side of said disk, the upper end of said lever being turned downwardly, and a float in the tank engaging said downwardly turned upper end of said lever.

2. In an automatic liquid supply means, a liquid tank, a float therein having an upstanding sleeve, and a top plate secured to said wall and surrounded thereby and in downwardly spaced relation with the upper end of the sleeve; a liquid supply valve discharging into said tank, and an operating lever for the aforesaid valve, said lever having a downwardly turned upper end resting on said top plate within the upper portion of said sleeve.

3. A device of the class described comprising a water tank, a float therein, a vertical water supply pipe extending into said tank and having a downwardly closing check valve, a stem within the lower portion of said pipe for raising said valve to open position, said stem having an enlargement at its lower end under said pipe, and an inclined lever fulcrumed in the tank, said lever having an upwardly turned lower end contacting with the lower side of said enlargement and having a downwardly turned upper end contacting with the upper side of the aforesaid float.

In testimony whereof I have hereunto affixed my signature.

CHARLES L. BURGE.